United States Patent [19]
Yamada

[11] Patent Number: 4,785,467
[45] Date of Patent: Nov. 15, 1988

[54] TRANSMISSION SYSTEM EMPLOYING HIGH IMPEDANCE DETECTION FOR CARRIER DETECTION

[75] Inventor: Kunihiro Yamada, Tokyo, Japan

[73] Assignee: Ricoh Company, Ltd., Tokyo, Japan

[21] Appl. No.: 39,219

[22] Filed: Apr. 17, 1987

[30] Foreign Application Priority Data

Apr. 24, 1986 [JP] Japan ................................. 61-96058
Apr. 24, 1986 [JP] Japan ................................. 61-96059

[51] Int. Cl.⁴ ...................... H04L 25/34; H04B 9/00
[52] U.S. Cl. ........................................ 375/17; 375/36; 455/608
[58] Field of Search ............... 375/17, 20, 36, 110; 307/473; 455/608, 606, 617, 618

[56] References Cited

U.S. PATENT DOCUMENTS 4,084,069 4/1978 Looschen ............................ 375/17
4,397,042 8/1983 Tsujii et al. ......................... 455/608

OTHER PUBLICATIONS

CCITT Recommendation vol. 21, vol. 26, vol. 27, vol. 29 (Red Book).
Roland J. Turner, "Schottky Diode Pair Makes an RF Detector Stable", Circuits for Electronics Engineers, 1977, p. 102-p. 103, McGraw-Hill.
William R. Bennet, James R. Davey, "Data Transmission", 1965, McGraw-Hill.

Primary Examiner—Robert L. Griffin
Assistant Examiner—Marianne Huseman
Attorney, Agent, or Firm—Oblon, Fisher, Spivak, McClelland & Maier

[57] ABSTRACT

A transmission system comprises a transmitter made up of a tri-state driver having a data input terminal supplied with a send data signal SD and an enable terminal supplied with a request to send signal RTS, and a receiver made up of a data detector for detecting the send data signal SD to produce a received data signal RD and a high impedance detector. The output impedance of the tri-state driver becomes high when the request to send signal RTS has a first logic value, and the high impedance detector produces a carrier detect signal CD having the first logic value to indicate that no carrier is detected when a high impedance state is detected.

11 Claims, 3 Drawing Sheets

TRANSMISSION SYSTEM EMPLOYING HIGH IMPEDANCE DETECTION FOR CARRIER DETECTION

BACKGROUND OF THE INVENTION

The present invention generally relates to transmission systems, and more particularly to a transmission system which transmits from a transmitter to a receiver a send data signal and a request to send signal by use of only a pair of transmission lines and carries out a carrier detection without being affected by a data pattern of the send data signal. In this regard, in the present disclosure all references to "carrier detection" refer to the detection of signal presence on the pair of transmission lines.

In a conventional transmission system employed in a local communication network, pairs of transmission lines are used exclusively for transmitting a request to send signal RTS and a send data signal SD from a transmitter, and for transmitting a received data signal RD and a carrier detect signal CD from a receiver. In other words, a large number of pairs of transmission line are required to transmit the signals RTS, SD, RD and CD.

In the conventional transmission system, because of the need to provide independent pairs of transmission lines for the signals RTS, SD, RD and CD, the provision of the lengthy and bulky transmission-line cables becomes a problem especially as the distance between the transmitter and the receiver becomes long. Accordingly, various transmission systems have been proposed to eliminate this problem.

For example, there is a previously proposed transmission system which uses only a pair of transmission lines to transmit the send data signal SD and the request to send signal RTS. According to this previously proposed transmission system, a carrier OFF state is detected when a logic value of the send data signal SD continues to be "0" for over a predetermined time. However, there is a problem in that the transmitting pattern of the send data signal SD becomes restricted. In addition, there is always a possibility that the data pattern of the send data signal SD becomes identical to the pattern (in this case, continuous "0" for over the predetermined time) which would be detected as the carrier OFF state.

Therefore, there is a demand for a transmission system which can transmit the signals RTS, SD, RD and CD by use of only a pair of transmission lines and will not generate the problems described above.

SUMMARY OF THE INVENTION

Accordingly, it is a general object of the present invention to provide a novel and useful transmission system in which the problems described heretofore are eliminated.

Another and more specific object of the present invention is to provide a transmission system in which a transmitter comprises a tri-state driver having a data input terminal supplied with a send data signal SD and an enable terminal supplied with a request to send signal RTS, and a receiver comprises a data detector for detecting the send data signal SD to produce a received data signal RD and a high impedance detector. The output impedance of the tri-state driver becomes high when the request to send signal RTS has a logic value "0", and the high impedance detector produces a carrier detect signal CD having a logic value "0" to indicate that no carrier is detected when a high impedance state is detected. According to the transmission system of the present invention, it is possible to transmit the send data signal SD and the request to send signal RTS by use of only a pair of transmission lines, without being affected by the data pattern of the send data signal SD.

Still another object of the present invention is to provide a transmission system of the type described above wherein the high impedance detector comprises means for pulling up or pulling down the potentials at the pair of transmission lines to a predetermined voltage when the output impedance of the tri-state driver becomes high, so that the high impedance state can be detected by a NAND gate or an OR gate which gates signals from the pair of transmission lines. According to the transmission system of the present invention, a differential line receiver supplied with the signals from the pair of transmission lines may be used as the data detector.

A further object of the present invention is to provide a transmission system of the type described above wherein the data detector comprises means for detecting a direction of current flow between two input terminals thereof supplied with signals from the pair of transmission lines, and the high impedance detector comprises an OR gate for detecting the high impedance state from output detection signals of the means within the data detector. According to the transmission system of the present invention, it is possible to ground the transmitter and the receiver to mutually different potentials, and it is also possible to eliminate the grounding completely.

Another object of the present invention is to provide a transmission system of the type described above wherein the high impedance detector is provided with a lowpass filter means for eliminating instantaneous noise. According to the transmission system of the present invention, it is possible to produce an accurate carrier detection signal CD.

Other objects and further features of the present invention will be apparent from the following detailed description when read in conjunction with the accompanying drawings.

DETAILED DESCRIPTION

Figure 1:
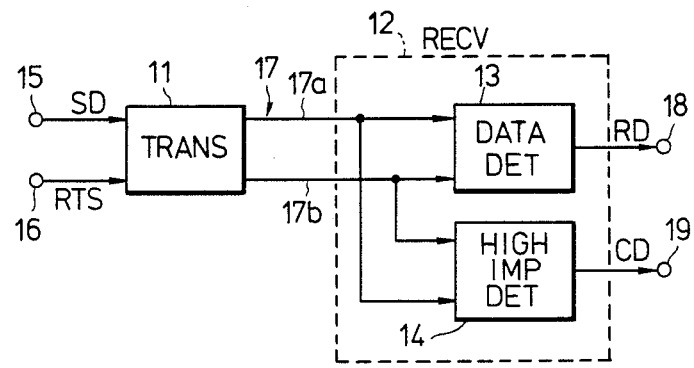
FIG. 1 is a system block diagram showing a first embodiment of the transmission system according to the present invention.

FIG. 1 shows a first embodiment of the transmission system according to the present invention. The transmission system comprises a transmitter 11, and a receiver 12 comprising a data detector 13 and a high impedance detector 14. A send data signal SD is applied to an input terminal 15, and a request to send signal RTS is applied to an input terminal 16. The transmitter 11 and the receiver 12 are coupled by a twisted pair cable 17 comprising transmission lines 17a and 17b. A received data signal RD is outputted via an output terminal 18, and a carrier detect signal CD is outputted via an output terminal 19.

Figure 2:
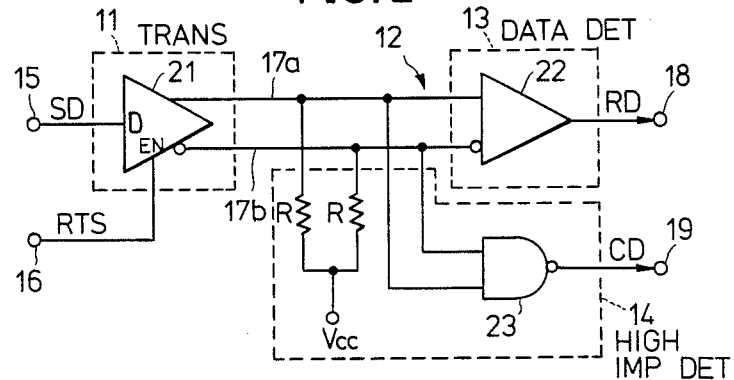
FIG. 2 is a system circuit diagram showing an embodiment of the circuit construction of the first embodiment.

FIG. 2 shows an embodiment of the circuit construction of the first embodiment. In FIG. 2, those parts which are the same as those corresponding parts in FIG. 1 are designated by the same reference numerals. The transmitter 11 comprises a tri-state differential amplifier type driver (hereinafter simply referred to as a tri-state driver) 21 having a data input terminal D supplied with the send data signal SD from the input terminal 15 and an enable terminal EN supplied with the request to send signal RTS from the input terminal 16. The data detector 13 comprises a differential line receiver (hereinafter simply referred to as a line receiver) 22 having two input terminals respectively supplied with signals from the lines 17a and 17b. The high impedance detector 14 comprises two resistors R and a 2-input NAND gate 23. Each of the two resistors R have one end thereof coupled to a power source terminal supplied with a power source voltage Vcc and the other end thereof coupled to a corresponding one of the lines 17a and 17b. The signals from the lines 17a and 17b are also supplied to the NAND gate 23. The received data signal RD is outputted from the line receiver 22, and the carrier detect signal CD is outputted from the NAND gate 23.

The output impedance of the tri-state driver 21 is high when the request to send signal RTS supplied to the enable terminal EN has a logic value "0". In this case, the potential at the lines 17a and 17b is approximately equal to Vcc due to the resistances of the two resistors R. When it is assumed that the voltage Vcc corresponds to a logic value "1", the NAND gate 23 produces a signal having a logic value "0" because the two signals supplied thereto have the voltage approximately equal to Vcc, and the high impedance state is detected. Hence, the carrier detect signal CD from the output terminal 18 has the logic value "0" indicating that no carrier is detected.

On the other hand, the output impedance of the tri-state driver 21 is low when the request to send signal RTS supplied to the enable terminal EN has a logic value "1". In this case, the potential at one of the lines 17a and 17b is high and the potential at the other one of the lines 17a and 17b is low. Depending on the logic value of the send data signal SD supplied to the data input terminal D of the tri-state driver 21, the potentials at the lines 17a and 17b respectively become high and low or low and high. When the high and low potentials at the lines respectively correspond to the logic values "1" and "0", the combination of the logic values of the signals transmitted via the lines 17a and 17b is "1/0" when the logic value of the send data signal SD is "1" and is "0/1" when the logic value of the send data signal SD is "0". In other words, when the request to send signal RTS has the logic value "1", the combination of the logic values of the signals transmitted via the lines 17a and 17b can only be "1/0" or "0/1", and the combinations "1/1" and "0/0" cannot occur. For this reason, the logic values of the signals supplied to the NAND gate 23 when the request to send signal RTS has the logic value "1" are mutually different, and a signal having the logic value "1" is produced from the NAND gate 23. Thus, the carrier detect signal CD has the logic value "1" in this case and indicates that a carrier is detected.

According to the present embodiment, the send data signal SD and the request to send signal RTS can be transmitted and the received data signal RD and the carrier detect signal CD can be obtained by use of only the pair of lines 17a and 17b. In addition, the carrier detect signal CD is independent of the data pattern of the send data signal SD.

The power source voltage Vcc may either be a positive voltage or a negative voltage. The circuit construction shown in FIG. 2 can be used when it is assumed that a voltage approximately equal to the positive or negative power source voltage corresponds to the logic value "1". On the other hand, when it is assumed that the voltage approximately equal to the positive or negative power source voltage Vcc corresponds to the logic value "0", an OR gate should be used instead of the NAND gate 23.

Figure 3:
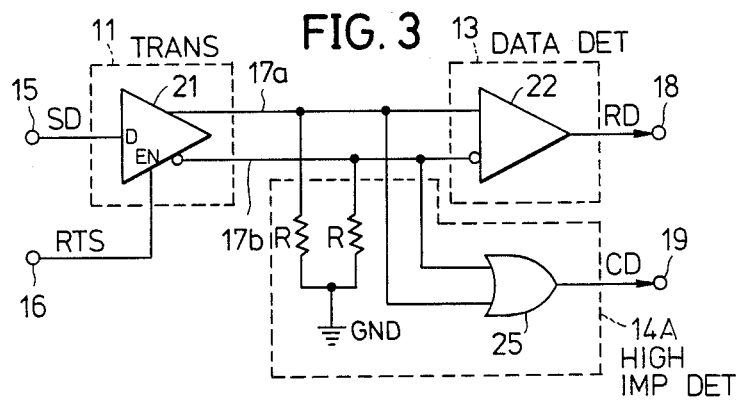
FIG. 3 is a circuit diagram showing a modification of the first embodiment.

FIG. 3 shows the circuit construction of a modification of the first embodiment. In FIG. 3, those parts which are the same as those corresponding parts in FIG. 2 are designated by the same reference numerals, and description thereof will be omitted. In this modification, a high impedance detector 14A comprises the two resistors R and an OR gate 25. The two resistors R each have one end thereof coupled to ground and the other end thereof coupled to a corresponding one of the lines 17a and 17b. The signals from the lines 17a and 17b are supplied to the OR gate 25. The carrier detect signal CD is outputted from the OR gate 25.

A common mode noise may be transmitted via the lines 17a and 17b, but the transmission of the common mode noise via the lines 17a and 17b is prevented in the present embodiment and the modification by using the driver (transmitter) and receiver of the balanced type. However, the gate (NAND gate 23 or OR circuit 25) may be affected by the common mode noise. As will be described later in conjunction with a second embodiment, the effects of the common mode noise on the gate may be eliminated by passing the carrier detect signal CD through a lowpass filter means.

Figure 4:
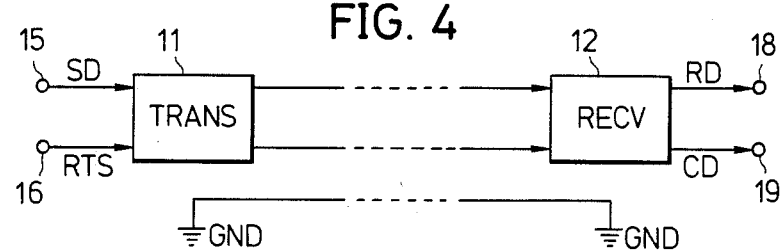
FIG. 4 is a system block diagram showing the grounding provided in the first embodiment and the modification thereof.

Although illustration of the grounding of the transmitter 11 and the receiver 12 is omitted in FIGS. 1 through 3, the transmitter 11 and the receiver 12 are grounded to a common ground potential as shown in FIG. 4.

Figure 5:
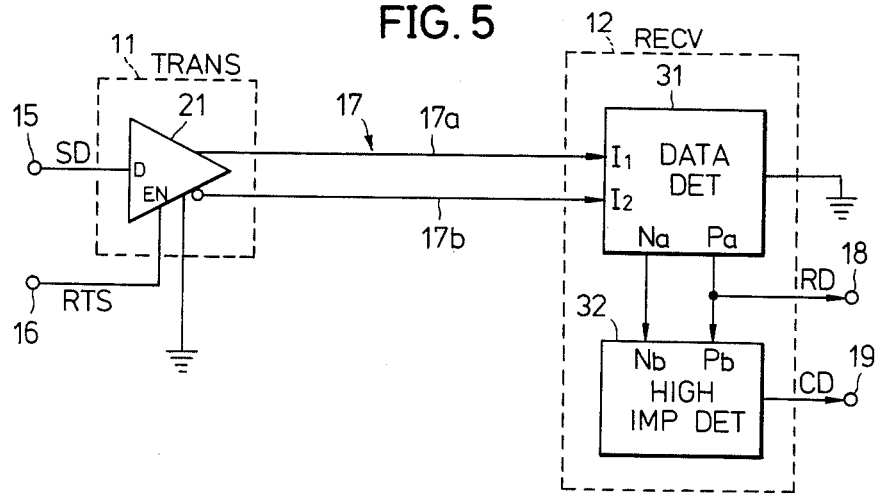
FIG. 5 is a system block diagram showing a second embodiment of the transmission system according to the present invention.

Next, description will be given with respect to a second embodiment of the transmission system according to the present invention. FIG. 5 shows the second embodiment, and in FIG. 5, those parts which are the same as those corresponding parts in FIG. 2 are designated by the same reference numerals, and description thereof will be omitted. In the present embodiment, the receiver 12 comprises a data detector 31 and a high impedance detector 32. The data detector 31 is essentially a detector for detecting a direction of current flow between input terminals $I_1$ and $I_2$ of the data detector 31. For example, a signal having the logic value "1" is obtained from an output terminal Pa of the data detector 31 when a current flows in a positive direction from the input terminal $I_1$ to the input terminal $I_2$, and a signal having the logic value "1" is obtained from an output terminal Na of the data detector 31 when a current flows in a negative direction from the input terminal $I_2$ to the input terminal $I_1$. Here, negative logic is assumed of the signal levels at the output terminals Na and Pa. The received data signal RD is obtained from the output terminal a (or Na) of the data detector 31. The high impedance detector 32 has input terminals Pb and Nb supplied with the signals from the respective output terminals Pa and Na of the data detector 31. When the request to send signal RTS has the logic value "0" and the output impedance of the tri-state driver 21 is high, no current flows between the input terminals $I_1$ and $I_2$ and the signals from the output terminals Pa and Na both have the logic value "0". The high impedance detector 32 detects the high impedance state when the signals supplied thereto both have the logic value "0", and produces a carrier detect signal CD having the logic value "0" which indicates that no carrier is detected.

The flow of current between the input terminals $I_1$ and $I_2$ cannot occur simultaneously in the positive and negative directions, and thus, the logic values of the signals supplied to the input terminals Pb and Nb cannot both be "1". In the case where the logic values of the signals supplied to the input terminals Pb and Nb are "1" and "0" or vice versa, the high impedance detector 32 detects a low impedance state and produces a carrier detect signal CD having the logic value "1".

Figure 6:
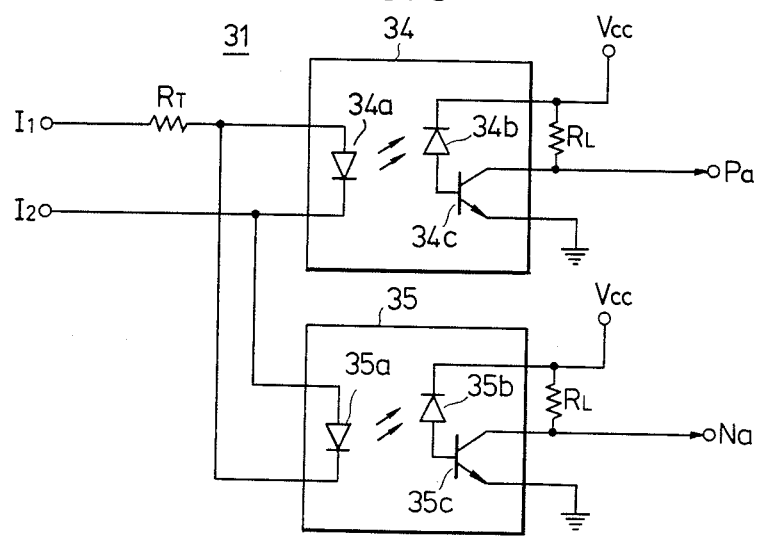
FIG. 6 a circuit diagram showing an embodiment of a data detector of the transmission system shown in FIG.5.

FIG. 6 shows an embodiment of the data detector 31. The data detector 31 comprises a resistor $R_T$, a pair of photo-coupled isolators (or optoelectronic coupler) 34 and 35, and two resistors $R_L$. The photo-coupled isolator 34 comprises photo-coupled diodes (light emitting diode and light sensitive diode) 34a and 34b and a transistor 34c. Similarly, the photo-coupled isolator 35 comprises photo-coupled diodes 35a and 35b and a transistor 35c. The anode of the light emitting diode 34a and the cathode of the light emitting diode 35a are coupled to the input terminal $I_1$ via the resistor $R_T$, and the cathode of the light emitting diode 34a and the anode of the light emitting diode 35a are coupled to the input terminal $I_2$. The anode of the light sensitive diode 34b is coupled to a base of the transistor 34c, and the cathode of the light sensitive diode 34b is coupled to the power source terminal Vcc. The resistor $R_L$ is coupled across the power source terminal Vcc and a collector of the transistor 34c, and the collector of the transistor 34c is also coupled to the output terminal Pa. An emitter of the transistor 34c grounded to a ground which may be independent of transmitter ground shown in FIG. 5. Similarly, the anode of the light sensitive diode 35b is coupled to a base of the transistor 35c, and the cathode of the light sensitive diode 35b is coupled to the power source terminal Vcc. The resistor $R_L$ is coupled across the power source terminal Vcc and a collector of the transistor 35c, and the collector of the transistor 34c is also coupled to the output terminal Na. An emitter of the transistor 35c is grounded.

The resistor $R_T$ is provided in order to match the input impedance of the receiver 12 (between the input terminals $I_1$ and $I_2$) to the line impedance. Hence, the resistor $R_T$ also limits the current flowing to the light emitting diodes 34a and 35a.

When the logic value of the request to send signal RTS is "0", no current flows between the input terminals $I_1$ and $I_2$ because the output impedance of the tri-state driver 21 is high. As a result, the signals from the output terminals Pa and Na both have the logic value "0". Whether or not a carrier is on the transmission line respectively correspond to whether or not a current flows between the input terminals $I_1$ and $I_2$. Hence, the carrier detection can be carried out by obtaining a logical sum of the logic values of the signals obtained from the output terminals Pa and Na.

Figure 7:
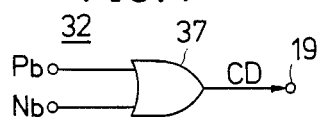
FIG. 7 is a circuit diagram showing an embodiment of a high impedance detectector of the transmission system shown in FIG. 5.

FIG. 7 shows an embodiment of the high impedance detector 32. As shown in FIG. 7, the high impedance detector 32 comprises an OR gate 37. Therefore, in the case described above, the high impedance detector 32 produces a signal having the logic value "0" responsive to the signals from the output terminals Pa and Na both having the logic value "0", and a carrier detect signal CD having the logic value "0" is obtained from the output terminal 19 indicating that no carrier is detected.

On the other hand, when the request to send signal RTS has the logic value "1", the output impedance of the tri-state driver 21 is low, and a current flows between the output terminals $I_1$ and $I_2$. The direction of the current flow depends on the logic value of the send data signal SD. For example, the current flows in the positive direction from the terminal $I_1$ to the terminal $I_2$ when the send data signal SD has the logic value "1", and the current flows in the negative direction from the terminal $I_2$ to the terminal $I_1$ when the send data signal SD has the logic value "0". Signals respectively having the logic values "1" and "0" are obtained from the output terminals Pa and Na when the current flows in the positive direction, and signals respectively having the logic values "0" and "1" are obtained from the output terminals Pa and Na when the current flows in the negative direction. Hence, in this case, the logic values of the send data signal SD, the signal from the output terminal Pa and the received data signal RD are the same when the request to send signal RTS has the logic value "1". Accordingly, in this case, the carrier detect signal CD having the logic value "1" is produced from the high impedance detector 32.

In FIG. 5, the received data signal RD is obtained from the output terminal Pa of the data detector 31. However, since the signals from the output terminals Na and Pa have mutually different logic values when the request to send signal RTS has the logic value "1", it is possible to make the logic values of the send data signal SD, the signal from the output terminal Na and the received data signal RD have the same logic value when the request to send signal RTS has the logic value "1". In this case, it is possible to obtain the received data signal RD from the output terminal Na of the data detector 31.

In FIG. 6, when the logic value of the send data signal SD changes from "1" to "0" or vice versa, the transition may not occur instantaneously. For this reason, the logic values of the signals from the lines 17a and 17b may become the same for an extremely short period of time. In addition, for example, a time it takes for an element to be turned ON is longer than a time it takes for the element to be turned OFF. Therefore, even when the transition in the send data signal SD occurs almost instantaneously, the logic values of the signals from the lines 17a and 17b may become the same for an extremely short period of time due to the difference in the times it takes for the element to become turned ON and OFF. In other words, in FIG. 6, the logic values of the signals obtained from the output terminals Pa and Na may both become "0" for an extremely short period of time.

Figure 8:
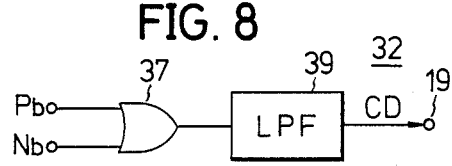
FIGS. 8 and 9 are system circuit diagrams respectively showing first and second modifications of the embodiment of the high impedance detector.

FIG. 8 shows a first modification of the embodiment of the high impedance detector 32. In FIG. 8, the high impedance detector 32 comprises the OR gate 37 and a lowpass filter 39. The lowpass filter 39 eliminates an instantaneous noise which is generated during the extremely short period of time as described above.

Figure 9:
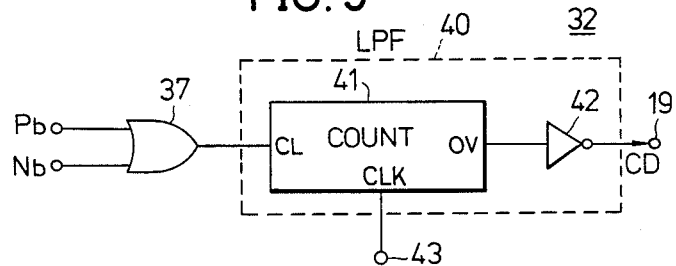

FIG. 9 shows a second modification of the embodiment of the high impedance detector 32. In FIG. 9, the high impedance detector 32 comprises the OR gate 37, and a lowpass filter 40 which is constituted by a counter 41 and an inverter 42. The output signal of the OR gate 37 is applied to a clear terminal CL of the counter 41, and the counter 41 is cleared when the output signal of the OR gate 37 has the logic value "1". In this case, a signal having the logic value "0" is outputted from an overflow terminal OV of the counter 41, and the carrier detect signal CD having the logic value "1" is produced from the inverter 42 to indicate that a carrier is detected.

When the logic values of the signals supplied to the OR gate 37 both become "0", a signal having a logic value "0" is applied to the clear terminal CL and the counter 41 is not cleared. Hence, the counter 41 counts up (or down) every time a rise (or a fall) is detected in a clock pulse signal which is obtained via a terminal 43 and is applied to a clock terminal CLK of the counter 41. Hence, the signal from the overflow terminal OV has the logic value "0" while the counter 41 does not overflow, and the signal from the overflow terminal OV has the logic value "1" and the carrier detect signal CD having the logic value "0" is produced when the overflow occurs so as to indicate that no carrier is detected. In other words, the logic value of the carrier detect signal CD becomes "0" only when the logic values of the signals supplied to the OR gate 37 continue to be both "0" for a predetermined time, and the logic value of the carrier detect signal CD remains to be "1" when the logic values of the signals supplied to the OR gate 37 both become "0" only for an instant.

The first and second modifications of the high impedance detector shown in FIGS. 8 and 9 may also be applied to the first embodiment shown in FIG. 1. It is evident that the OR gate 37 should be replaced by a NAND gate when the arrangement shown in FIG. 2 is employed to detect the high impedance state.

Figure 10:
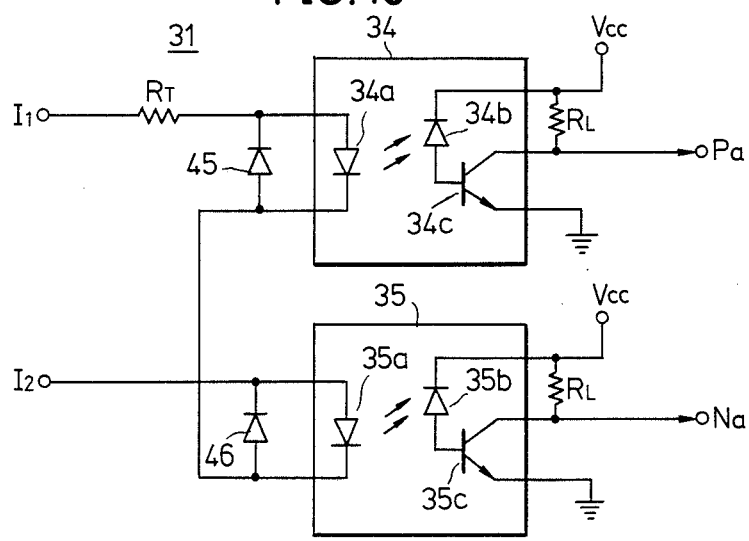
FIG. 10 is a circuit diagram showing another embodiment of the data detector of the transmission system shown in FIG. 5.

FIG. 10 shows another embodiment of the data detector 31. In FIG. 10, those parts which are the same as those corresponding parts in FIG. 6 are designated by the same reference numerals, and description thereof will be omitted. In the present embodiment, a diode 45 is coupled in parallel with the light emitting diode 34a so that the cathode of the diode 45 is coupled to the input terminal $I_1$ via the resistor $R_T$ and the anode of the diode 45 is coupled to the input terminal $I_2$ via a diode 46. The diode 46 is coupled in parallel with the light emitting diode 35a so that the anode of the diode 46 is coupled to the anode of the diode 45 and the cathode of the diode 46 is coupled to the input terminal $I_2$. For example, Schottky barrier diodes having a low forward voltage are used for the diodes 45 and 46.

When the current flows in the positive direction from the terminal $I_1$ to the terminal $I_2$, the current flows through the light emitting diode 34a of the photo-coupled isolator 34 and the diode 46, and the current will not flow to the light emitting diode 35a of the photo-coupled isolator 35. Similarly, when the current flows in the negative direction from the terminal $I_2$ to the terminal $I_1$, the current flows through the light emitting diode 35a of the photo-coupled isolator 35 and the diode 45, and the current will not flow to the light emitting diode 34a of the photo-coupled isolator 34. For this reason, the light emitting diodes 34a and 35a will not be reverse biased, and a charge build-up will not occur at the light emitting diodes 34a and 35a thereby facilitating high speed operation of the data detector 31.

For example, an ultra high-speed photo-coupled isolator HCPL-2602 manufactured by Yokogawa Hewlett Packard of Japan may be used for the data detector 31 shown in FIG. 10. As explained in the operating manual for the HCPL-2602, it is possible to add a NAND flip-flop, a NOR flip-flop, or an exclusive-OR flip-flop for the purpose of eliminating a noise generated in the HCPL-2602.

In the second embodiment shown in FIG. 5 and described especially with reference to FIGS. 6 and 10, the illustration of the grounding of the transmitter 11 and the receiver 12 is omitted. However, the grounding potential may be different between the transmitter 11 and the receiver 12. Furthermore, in principle, it is possible omit the grounding of the transmitter 11 and the receiver 12. In this case, it is possible to set up the transmission system with extreme ease. When the transmitter 11 and the receiver 12 are grounded to a common ground potential and an accident occurs at one end of the transmission system, an operator on the other end of the transmission system may receive an electrical shock when the operator touches a body of the apparatus which is coupled to the ground line. But according to the second embodiment, it is possible to prevent such an accident because it is possible in principle to omit the grounding.

In the embodiments described heretofore, it is described for convenience' sake that the transmission system comprises one transmitter and one receiver. But in actual practice, the transmission system usually comprises a transmitter and a receiver at one end, and a receiver and a transmitter at the other end. The present invention can of course be applied to such a transmission system.

Further, the present invention is not limited to these embodiments, but various variations and modifications may be made without departing from the scope of the present invention.

What is claimed is:

1. A transmission system comprising:
    a transmitter comprising a tri-state driver having a data input terminal, an enable terminal and two output terminals, said data input terminal being supplied with a send data signal, said enable terminal being supplied with a request to send signal, said tri-state driver having a high output impedance state when said request to send signal has a first logic value and said two output terminals outputting complementary data signals in accordance with said send data signal when said request to send signal has a second logic value;
    a pair of transmission lines each having one end coupled to a corresponding one of the two output terminals of said tri-state driver; and a receiver comprising a data detector for detecting the complementary data signals from the pair of transmission lines to produce a received data signal when the tri-state driver is not in said high output impedance state, and a high impedance state detector for producing a carrier detect signal having a predetermined logic value to indicate that no carrier is present on the pair of transmission lines when a high output impedance state of said tri-state driver is detected.

2. A transmission system as claimed in claim 1 in which said data detector comprises a differential line receiver having two input terminals and one output terminal, said pair of transmission lines each having another end coupled to a corresponding one of the two input terminals of said differential line receiver, said received data signal being produced from the output terminal of said differential line receiver, and said high impedance detector comprises circuit means coupled to the pair of transmission lines for pulling potentials at the pair of transmission lines to a predetermined voltage when the output impedance of the tri-state driver is high and a gate for carrying out a logical operation on signals obtained from the pair of transmission lines, said gate producing said carrier detect signal.

3. A transmission system as claimed in claim 2 in which said predetermined voltage is a positive or negative voltage which is regarded as a second logic value, and said gate comprises a NAND gate.

4. A transmission system as claimed in claim 2 in which said predetermined voltage is a ground potential which is regarded as the first logic value, and said gate comprises an OR gate.

5. A transmission system as claimed in claim 2 in which said circuit means comprises a first resistor having one end coupled to one of the pair of transmission lines and a second resistor having one end coupled to the other of the pair of transmission lines, other ends of the first and second resistors being coupled to a terminal supplied with the predetermined voltage.

6. A transmission system as claimed in claim 1 in which said pair of transmission lines constitute a twisted pair cable, and said transmitter and said receiver are grounded to a common ground potential.

7. A transmission system as claimed in claim 1 in which said data detector comprises two input terminals, two output terminals and means for detecting a direction of current flow between the two input terminals thereof, said pair of transmission lines each having another end coupled to a corresponding one of the two input terminals of said data detector, said received data signal being produced from one of the two terminals of said data detector, and said high impedance detector comprises a gate for carrying a logical operation on signals from the two output terminals of said data detector and for producing the carrier detect signal having the first logic level when the output impedance of the tri-state driver is high and no current flows between the two input terminals of said data detector.

8. A transmission system as claimed in claim 7 in which said data detector produces a signal having a second logic value at one of the two output terminals when a current flows in a first direction between the two input terminals and produces a signal having the second logic value at the other of the two output terminals when a current flows in a second direction between the two input terminals, and said gate of said high impedance detector comprises an OR gate.

9. A transmission system as claimed in claim 7 in which said means for detecting the direction of current flow between the two input terminals comprises a first photo-coupled isolator for producing a signal having the second logic value when a current flow in the first direction is detected and a second photo-coupled isolator for producing a signal having the second logic value when a current flow in the second direction is detected.

10. A transmission system as claimed in claim 9 in which said transmitter and said receiver are grounded independently.

11. A transmission system as claimed in claim 1 in which said high impedance detector further comprises means for detecting the high impedance state of said tri-state driver and for producing a detection signal, and a lowpass filter for filtering the detection signal and for outputting the carrier detect signal.

* * * * *